(12) United States Patent
Phelan

(10) Patent No.: US 7,213,918 B2
(45) Date of Patent: May 8, 2007

(54) METHOD FOR MAKING COLORED SILICONE HYDROGEL CONTACT LENSES

(75) Inventor: John Christopher Phelan, Duluth, GA (US)

(73) Assignee: Novartis AG, Basel (CH)

( * ) Notice: Subject to any disclaimer, the term of this patent is extended or adjusted under 35 U.S.C. 154(b) by 0 days.

(21) Appl. No.: 11/216,366

(22) Filed: Aug. 31, 2005

(65) Prior Publication Data

US 2006/0055882 A1    Mar. 16, 2006

Related U.S. Application Data

(60) Provisional application No. 60/606,482, filed on Sep. 1, 2004.

(51) Int. Cl.
*G02C 7/02* (2006.01)
*D06P 5/00* (2006.01)

(52) U.S. Cl. .................. 351/177; 351/178; 8/507; 425/808

(58) Field of Classification Search ............... 351/177
See application file for complete search history.

(56) References Cited

U.S. PATENT DOCUMENTS

| | | | |
|---|---|---|---|
| 3,476,499 A | 11/1969 | Wichterle | 8/4 |
| 3,536,386 A | 10/1970 | Spivack | 351/160 |
| 3,679,504 A | 7/1972 | Wichterle | 156/62 |
| 3,712,718 A | 1/1973 | LeGrand | 351/160 |
| 4,252,421 A | 2/1981 | Foley | 351/160 |
| 4,405,773 A | 9/1983 | Loshack | 351/160 |
| 4,460,523 A | 7/1984 | Neefe | 264/1.1 |
| 4,468,229 A | 8/1984 | Su | 8/507 |
| 4,472,327 A | 9/1984 | Neefe | 264/1.9 |
| 4,582,402 A | 4/1986 | Knapp | 351/162 |
| 4,634,449 A | 1/1987 | Jenkins | 8/507 |
| 4,639,105 A | 1/1987 | Neefe | 351/162 |
| 4,668,240 A | 5/1987 | Loshack | 8/507 |
| 4,704,017 A | 11/1987 | Knapp | 351/177 |
| 4,719,657 A | 1/1988 | Bawa | 8/453 |
| 4,744,647 A | 5/1988 | Meshel | 351/177 |
| 4,857,072 A | 8/1989 | Narducy | 8/507 |
| 4,954,132 A | 9/1990 | Hung | 8/507 |
| 4,963,159 A | 10/1990 | Narducy | 8/507 |
| 5,034,166 A | 7/1991 | Rawlings | 264/1.7 |
| 5,116,112 A | 5/1992 | Rawlings | 351/162 |
| 5,120,121 A | 6/1992 | Rawlings | 351/162 |
| 5,260,000 A | 11/1993 | Nandu | 264/2.1 |
| 5,272,010 A | 12/1993 | Quinn | 428/411 |
| 5,414,477 A | 5/1995 | Jahnke | 351/162 |
| 5,452,658 A | 9/1995 | Shell | 101/401.1 |
| 5,637,265 A | 6/1997 | Misciagno | 264/1.7 |
| 5,793,466 A | 8/1998 | Moncada | 351/162 |
| 5,936,705 A | 8/1999 | Ocampo | 351/162 |
| 6,030,078 A | 2/2000 | Ocampo | 351/162 |
| 6,132,043 A | 10/2000 | Atkins | 351/162 |
| 6,164,777 A | 12/2000 | Li | 351/162 |
| 6,315,410 B1 | 11/2001 | Doshi | 351/162 |
| 6,337,040 B1 | 1/2002 | Thakrar | 264/1.7 |
| 6,359,024 B2 | 3/2002 | Lai | 522/64 |
| 6,465,538 B2 | 10/2002 | Lai | 522/64 |
| 6,523,953 B2 | 2/2003 | Jahnke | 351/162 |
| 7,021,761 B2 * | 4/2006 | Kunzler et al. | 351/162 |
| 2001/0050753 A1 | 12/2001 | Tucker | 351/177 |
| 2002/0027638 A1 | 3/2002 | Thakrar | 351/162 |
| 2003/0000028 A1 * | 1/2003 | Molock et al. | 8/506 |
| 2003/0054109 A1 | 3/2003 | Quinn | 427/385.5 |
| 2003/0071964 A1 | 4/2003 | Doshi | 351/159 |
| 2003/0119943 A1 | 6/2003 | Tucker | 523/160 |
| 2003/0165015 A1 | 9/2003 | Jahnke | 359/581 |
| 2004/0044099 A1 | 3/2004 | Tucker | 523/160 |
| 2005/0168688 A1 * | 8/2005 | Doshi et al. | 351/162 |
| 2005/0218536 A1 * | 10/2005 | Quinn et al. | 264/1.7 |

FOREIGN PATENT DOCUMENTS

| | | |
|---|---|---|
| EP | 1 235 096 | 2/2002 |
| FR | 1499774 | 11/1966 |
| WO | WO 02/074186 | 9/2002 |

OTHER PUBLICATIONS

Standard Search Report PCT EP/2005/009389 dated Feb. 24, 2005.
International Search Report with Written Opinion PCT/EP2005/009389 dated Nov. 24, 2005.

* cited by examiner

*Primary Examiner*—Jordan Schwartz
*Assistant Examiner*—Jessica Stultz
(74) *Attorney, Agent, or Firm*—Sheng-Hsin Hu; Jian Zhou

(57) ABSTRACT

The present invention generally relates to a method for making made-to-order (MTO) or customized silicone hydrogel lenses which have printed images on and/or below lens surfaces. A preferred method of the invention comprises printing and curing an ink on the molding surface of a mold for molding a single-side molded lens blank, producing the single-sided molded lens blank having a molded surface corresponding to one of the anterior and posterior surfaces of the lens to be produced and having an image embedded in the lens body and below lens surface, and directly lathing the lens blank on the side opposite to the molded surface to form the other lens surface. Colored silicone hydrogel lenses produced according to the invention will be useful as daily wear lenses and extended wear lenses. The lenses will allow alteration or enhancement of a patient's eye color.

20 Claims, No Drawings

METHOD FOR MAKING COLORED SILICONE HYDROGEL CONTACT LENSES

This application claims the benefit under 35 USC §119(e) of U.S. Provisional Application No. 60/606,482 filed Sep. 1, 2004, which is incorporated herein by reference in its entirety.

The present invention generally relates to a method for making colored silicone hydrogel contact lenses. More specifically, the present invention relates to a method for making made-to-order or customized colored silicone hydrogel contact lenses.

BACKGROUND

For cosmetic purposes, contact lenses having one or more colorants dispersed in the lens or printed on the lens are in high demand. These colored contact lenses enhance the natural beauty of the eye, or provide unique patterns on the iris of the wearer, or provide non cosmetic patterns or marks, such as rotation marks, inversion marks, product/brand codes, lot numbers, "DEMO" lenses, and the like, which are of benefits to wearers, eye-care practitioners and manufacturers.

Various methods have been disclosed to make colored non-silicone hydrogel contact lenses (see, for example, disclosed in U.S. Pat. Nos. 4,668,240, 4,857,072, 5,272,010, and 5,414,477 and U.S. Patent Application publication Nos. 2003/0054109 and 2004/0044099, all of which are incorporated herein by reference). Commercially available colored contact lenses is prepared from non-silicone hydrogel material, such as, for example, a hydroxyethylmethacrylate (HEMA)-based hydrogel (i.e., a copolymer of HEMA with other comonomers and/or crosslinkers). Those non-silicone hydrogel lenses generally do not have a high oxygen permeability. It is known that contact lenses must allow oxygen from the surrounding air (i.e., oxygen) to reach the cornea because the cornea does not receive oxygen from the blood supply like other tissue. If sufficient oxygen does not reach the cornea, corneal swelling occurs. Extended periods of oxygen deprivation cause the undesirable growth of blood vessels in the cornea. Hydrogel contact lenses conform closely to the shape of the eye, so oxygen cannot easily circumvent the lens. Thus, hydrogel contact lenses must allow oxygen to diffuse through the lens to reach the cornea, namely having a relatively high oxygen transmissibility (i.e., oxygen permeability over the lens thickness) from the outer surface to the inner surface to allow sufficient oxygen permeate through the lens to the cornea and to have minimal adverse effects on corneal health.

In recent years, silicone hydrogel contact lenses, for example, Focus NIGHT & DAY™ (CIBA VISION), become more and more popular because of corneal health benefits provided by their high oxygen permeability and comfort. However, few methods have been developed for making colored silicone hydrogels contact lenses, in particular, made-to-order (MTO) or customized colored silicone hydrogel contact lenses. MTO or customized colored silicone hydrogel contact lenses, which are typically made by directly lathing, can match a patient's prescription and/or have a base curve desired by the patient.

Therefore, there are needs for a method for making MTO or customized colored silicone hydrogel contact lenses.

SUMMARY OF THE INVENTION

The present invention, in one aspect, provides a method of making colored silicone-hydrogel contact lenses, the method comprising: providing a mold for cast-molding of a bonnet, wherein the mold includes a molding surface with optical quality, wherein the molding surface defines one of the posterior and anterior surface of a silicone hydrogel contact lens; applying a color coat to at least a portion of the molding surface of the mold with an ink, wherein the ink comprises at least one colorant and a silicone-containing polymer binder; curing the colored coat to form a colored film which is in contact with the molding surface but is not covalently attached to the molding surface; filling the mold with a lens-forming fluid material comprising at least one silicone-containing vinylic monomer or macromer and at least one hydrophilic vinylic monomer; letting the lens-forming material to soak the colored film for a period of time sufficient so that a portion of the lens-forming material penetrates into space between the colored film and the molding surface while detaching partially or completely the colored film from the molding surface; curing the lens-forming material in the mold to form a bonnet having a molded surface corresponding to one of the anterior and posterior surfaces of the contact lens, wherein the bonnet includes the colored film immobilized therein and/or thereon; removing the bonnet from the mold; post-curing and/or drying the bonnet for a time sufficient long to increase the lathability at room temperature of the bonnet; and forming the anterior or posterior surface by directly lathing of the bonnet on the side opposite to the molded surface, thereby obtaining the colored silicone hydrogel contact lens.

The present invention, in another aspect, provides a method of making colored silicone-hydrogel contact lenses, the method comprising: providing a mold for cast-molding of a bonnet, wherein the mold includes a molding surface with optical quality, wherein the molding surface defines one of the posterior and anterior surface of a silicone hydrogel contact lens; applying a color coat to at least a portion of the molding surface of the mold with an ink, wherein the ink comprises at least one colorant and a polymer binder, wherein the binder polymer comprises segments derived from at least one hydrophilic vinylic monomer or macromer; optionally curing the colored coat to form a colored film which is not covalently attached to the molding surface; filling the mold with a lens-forming fluid material comprising at least one silicone-containing vinylic monomer or macromer and at least one hydrophilic vinylic monomer; curing the lens-forming material in the mold to form a bonnet having a molded surface corresponding to one of the anterior and posterior surfaces of the contact lens, wherein the bonnet includes the colored coat or film immobilized therein and/or thereon, wherein the molded surface of the bonnet includes at least a portion of the colored coat or film; removing the bonnet from the mold; post-curing and/or drying the bonnet for a time sufficient long to increase the lathability at room temperature of the bonnet; and forming the anterior or posterior surface by directly lathing of the bonnet on the side opposite to the molded surface, thereby obtaining the colored silicone hydrogel contact lens.

DETAILED DESCRIPTION OF EMBODIMENTS OF THE INVENTION

Reference now will be made in detail to the embodiments of the invention. It will be apparent to those skilled in the art that various modifications and variations can be made in the present invention without departing from the scope or spirit of the invention. For instance, features illustrated or described as part of one embodiment, can be used on another embodiment to yield a still further embodiment. Thus, it is intended that the present invention cover such modifications and variations as common within the scope of the appended claims and their equivalents. Other objects, features and aspects of the present invention are disclosed in or are obvious from the following detailed description. It is to be understood by one of ordinary skill in the art that the present discussion is a description of exemplary embodiments only, and is not intended as limiting the broader aspects of the present invention.

Unless defined otherwise, all technical and scientific terms used herein have the same meaning as commonly understood by one of ordinary skill in the art to which this invention belongs. Generally, the nomenclature used herein and the laboratory procedures are well known and commonly employed in the art. Conventional methods are used for these procedures, such as those provided in the art and various general references. Where a term is provided in the singular, the inventors also contemplate the plural of that term. The nomenclature used herein and the laboratory procedures described below are those well known and commonly employed in the art.

A "contact Lens" refers to a structure that can be placed on or within a wearer's eye. A contact lens can correct, improve, or alter a user's eyesight, but that need not be the case. A contact lens can be of any appropriate material known in the art or later developed, and can be a soft lens, a hard lens, or a hybrid lens. Typically, a contact lens has an anterior surface and an opposite posterior surface and a circumferential edge where the anterior and posterior surfaces are tapered off.

The "front or anterior surface" of a contact lens, as used herein, refers to the surface of the lens that faces away from the eye during wear. The anterior surface, which is typically substantially convex, may also be referred to as the front curve of the lens.

The "rear or posterior surface" of a contact lens, as used herein, refers to the surface of the lens that faces towards the eye during wear. The rear surface, which is typically substantially concave, may also be referred to as the base curve of the lens.

A "colored contact lens" refers to a contact lens (hard or soft) having a color image printed thereon.

A "color image" is intended to describe a cosmetic pattern (e.g., iris-like patterns, Wild Eye™ patterns, made-to-order (MTO) patterns, and the like), an inversion mark that allows a user to handle and insert easily a contact lens, and/or contact lenses stock keeping units (SKUs) either in print forms of numbers or as bar codes. A color image can be a single color image or a multi-color image. A color image is preferably a digital image, but it can also be an analog image.

A "colored coat" refers to a coating on an object and having a color image printed therein.

A "colorant" means either a dye or a pigment or a mixture thereof that is used to print a color image on an article.

"Dye" means a substance that is soluble in a solvent and that is used to impart color. Dyes are typically translucent and absorb but do not scatter light. Dyes can cover both optical regions of contact lenses and non-optical regions of contact lenses. Nearly any dye can be used in the present invention, so long as it can be used in an apparatus as described below. These dyes include fluorescent dyes, phosphorescent dyes, and conventional dyes.

"Fluorescence" means luminescence caused by absorption of visible light or ultraviolet radiation at one wavelength followed by nearly immediate emission at a longer wavelength. Fluorescent emission ceases almost immediately when the light or incident ultraviolet radiation stops.

"Phosphorescence" is luminescence caused by the absorption of radiation at one wavelength followed by delayed emission at a different wavelength. Phosphorescent emission continues for a prolohged time after the incident radiation stops.

A "pigment" means a powdered substance that is suspended in a liquid in which it is insoluble. Pigments are used to impart color. Pigments, in general, are more opaque than dyes.

The term "a conventional or non-pearlescent pigment" as used herein is intended to describe any absorption pigments that impart color based on the optical principle of diffuse scattering and its color is independent of its geometry. While any suitable non-pearlescent pigment may be employed, it is presently preferred that the non-pearlescent pigment be heat resistant, non-toxic and insoluble in aqueous solutions. Examples of preferred non-pearlescent pigments include any colorant permitted in medical devices and approved by the FDA, such as D&C Blue No. 6, D&C Green No. 6, D&C Violet No. 2, carbazole violet, certain copper complexes, certain chromium oxides, various iron oxides, phthalocyanine (PCN) green, phthalocyanine (PCN) blue, titanium dioxides, etc. See Marmiom DM Handbook of U.S. Colorants for a list of colorants that may be used with the present invention. A more preferred embodiment of a non-pearlescent pigment include (C.I. is the color index no.), without limitation, for a blue color, phthalocyanine blue (pigment blue 15:3, C.I. 74160), cobalt blue (pigment blue 36, C.I. 77343), Toner cyan BG (Clariant), Permajet blue B2G (Clariant); for a green color, phthalocyanine green (Pigment green 7, C.I. 74260) and chromium sesquioxide; for yellow, red, brown and black colors, various iron oxides; PR122, PY154, for violet, carbazole violet; for black, Monolith black C-K (CIBA Specialty Chemicals).

"Pearlescence" means having a pearly luster; resembling a pearl in physical appearance; or having a nearly neutral slightly bluish medium gray color.

A "pearlescent pigment" refers to a class of interference (effect) pigments, which are transparent thin platelets of low refractive index material (e.g., transparent mica platelets) coated with optically thin coating of a high refractive index material (e.g., metal oxide, such as, for example titanium oxide or iron oxide), and which impart color mainly based on the optical principle of thin-film interference. The optically thin coating of metal oxide can be comprised of single or multiple thin layers of metal oxide. Optically thin coatings applied to the platelets contribute interference effects, which allows the appearance to vary depending upon illumination and viewing conditions. The color is determined by the coating thickness, the refractive index and the angle of illumination. Optically thin coatings are also responsible for the rich deep glossy effect due to partial reflection from and partial transmission through the mica platelets. This class of pigment can provide pearly luster and iridescent effects.

Pearlescent pigments which are mica platelets with an oxide coating are commercially available from by the Englehard Corp. of Iselin, N.J., under the "Mearlin Pigment" line, such as "Hi-Lite Interference Colors," "Dynacolor Pearlescent Pigments", "MagnaPearl", "Flamenco," and "Celini Colors." Additional manufacturers of pearlescent colorants are: Kemira, Inc. in Savannah, Ga., the pigments having the trade name "Flonac Lustre Colors"; and EM Industries, Inc. of Hawthorne, N.Y., the pigments having the trade name "Affair Lustre Pigments".

A "hydrogel" refers to a polymeric material which can absorb at least 10 percent by weight of water when it is fully hydrated. Generally, a hydrogel material is obtained by polymerization or copolymerization of at least one hydrophilic monomer in the presence of or in the absence of additional monomers and/or macromers.

A "silicone hydrogel" refers to a hydrogel obtained by copolymerization of a polymerizable composition comprising at least one silicone-containing vinylic monomer or at least one silicone-containing macromer.

"Hydrophilic," as used herein, describes a material or portion thereof that will more readily associate with water than with lipids.

A "lens-forming material" refers to a polymerizable composition (or formulation) which can be cured (i.e., polymerized and/or crosslinked) thermally or actinically to obtain a crosslinked polymer. As used herein, "actinically" in reference to curing or polymerizing of a polymerizable composition or material or a lens-forming material means that the curing (e.g., crosslinked and/or polymerized) is performed by actinic irradiation, such as, for example, UV irradiation, ionized radiation (e.g. gamma ray or X-ray irradiation), microwave irradiation, and the like. Thermal curing or actinic curing methods are well-known to a person skilled in the art. Lens-forming materials are well known to a person skilled in the art.

A "prepolymer" refers to a starting polymer which can be cured (e.g., crosslinked and/or polymerized) actinically or thermally or chemically to obtain a crosslinked and/or polymerized polymer having a molecular weight much higher than the starting polymer. A "crosslinkable prepolymer" refers to a starting polymer which can be crosslinked upon actinic radiation to obtain a crosslinked polymer having a molecular weight much higher than the starting polymer.

A "monomer" means a low molecular weight compound that can be polymerized. Low molecular weight typically means average molecular weights less than 700 Daltons.

A "vinylic monomer", as used herein, refers to a low molecular weight compound that has an ethylenically unsaturated group and can be polymerized actinically or thermally. Low molecular weight typically means average molecular weights less than 700 Daltons.

The term "olefinically unsaturated group" or "ethylenically unsaturated group" is employed herein in a broad sense and is intended to encompass any groups containing at least one >C=C< group. Exemplary ethylenically unsaturated groups include without limitation acryloyl, methacryloyl, allyl, vinyl, styrenyl, or other C=C containing groups.

A "hydrophilic vinylic monomer", as used herein, refers to a vinylic monomer which is capable of forming a homopolymer that can absorb at least 10 percent by weight water when fully hydrated.

A "hydrophobic vinylic monomer", as used herein, refers to a vinylic monomer which is capable of forming a homopolymer that can absorb less than 10 percent by weight water when fully hydrated.

A "macromer" refers to a medium to high molecular weight compound or polymer that contains functional groups capable of undergoing further polymerizing/crosslinking reactions. Medium and high molecular weight typically means average molecular weights greater than 700 Daltons. Preferably, a macromer contains ethylenically unsaturated groups and can be polymerized actinically or thermally.

"Molecular weight" of a polymeric material (including monomeric or macromeric materials), as used herein, refers to the number-average molecular weight unless otherwise specifically noted or unless testing conditions indicate otherwise.

A "polymer" means a material formed by polymerizing/crosslinking one or more monomers, macromers and or oligomers.

"A binder polymer" refers to a crosslinkable polymer that can be crosslinked by a crosslinker or upon initiation by a chemical or physical means (e.g., moisture, heating, UV irradiation or the like) to trap or bind colorants onto or into a medical device (preferably a contact lens) such as that term is known in the art.

A "photoinitiator" refers to a chemical that initiates radical crosslinking and/or polymerizing reaction by the use of light. Suitable photoinitiators include, without limitation, benzoin methyl ether, diethoxyacetophenone, a benzoylphosphine oxide, 1-hydroxycyclohexyl phenyl ketone, Darocure® types, and Irgacure® types, preferably Darocure® 1173, and Irgacure® 2959. Azo type initiators [e.g. 2,2'-azobis(2,4-dimethylpentanenitrile), 2,2'-azobis(2-methylpropanenitrile), 2,2'-azobis(2-methylbutanenitrile)] can be use as photo or thermal initiators.

A "thermal initiator" refers to a chemical that initiates radical crosslinking/polymerizing reaction by the use of heat energy. Examples of suitable thermal initiators include, but are not limited to, 2,2'-azobis(2,4-dimethylpentanenitrile), 2,2'-azobis(2-methylpropanenitrile), 2,2'azobis(2-methylbutanenitrile), peroxides such as benzoyl peroxide, and the like. Preferably, the thermal initiator is azobisisobutyronitrile (AIBN).

The term "fluid" as used herein indicates that a material is capable of flowing like a liquid.

An "interpenetrating polymer network (IPN)" as used herein refers broadly to an intimate network of two or more polymers at least one of which is either synthesized and/or crosslinked in the presence of the other(s). Techniques for preparing IPN are known to one skilled in the art. For a general procedure, see U.S. Pat. Nos. 4,536,554, 4,983,702, 5,087,392, and 5,656,210, the contents of which are all incorporated herein by reference. The polymerization is generally carried out at temperatures ranging from about room temperature to about 145° C.

The "oxygen transmissibility" of a lens, as used herein, is the rate at which oxygen will pass through a specific ophthalmic lens. Oxygen transmissibility, Dk/t, is conventionally expressed in units of barrers/mm, where t is the average thickness of the material [in units of mm] over the area being measured and "barrer/mm" is defined as:

$$[(cm^3\ oxygen)/(cm^2)(sec)(mm^2\ Hg)] \times 10^{-9}$$

The intrinsic "oxygen permeability", Dk, of a lens material does not depend on lens thickness. Intrinsic oxygen permeability is the rate at which oxygen will pass through a material. Oxygen permeability is conventionally expressed in units of barrers, where "barrer" is defined as:

$$[(cm^3\ oxygen)(mm)/(cm^2)(sec)(mm^2\ Hg)] \times 10^{-9}$$

These are the units commonly used in the art. Thus, in order to be consistent with the use in the art, the unit "barrer" will have the meanings as defined above. For example, a lens having a Dk of 90 barrers ("oxygen permeability barrers")

and a thickness of 90 microns (0.090 mm) would have a Dk/t of 100 barrers/mm (oxygen transmissibility barrers/mm).

The "ion permeability" through a lens correlates with the Ionoflux Diffusion Coefficient. The Ionoflux Diffusion Coefficient, D, is determined by applying Fick's law as follows:

$$D = -n'/(A \times dc/dx)$$

where
n'=rate of ion transport [mol/min]
A=area of lens exposed [mm$^2$]
D=Ionoflux Diffusion Coefficient [mm$^2$/min]
dc=concentration difference [mol/L]
dx=thickness of lens [mm]

An Ionoflux Diffusion Coefficient, D, of greater than about $1.5 \times 10^{-6}$ mm$^2$/min is preferred, while greater than about $2.6 \times 10^{-6}$ mm$^2$/min is more preferred and greater than about $6.4 \times 10^{-6}$ mm$^2$/min is most preferred.

"Room temperature" (or "ambient temperature") is defined as 22±3° C.

The term "lathability" in reference to a material is referred to its capability to be machined into a contact lens with optical quality using typical lens lathing equipments. One gauge of lathability of a material is its glass transition temperature ($T_g$). Single phase polymeric materials with $T_g$ below room temperature are considered to be too soft for room temperature lathing whereas those with $T_g$ above room temperature, preferably at least 3 degrees above room temperature, have sufficient hardness for lathing at room temperature. Microscopically multiphasic polymeric materials may display one apparent single $T_g$ or more than one $T_g$. As long as a microscopically multiphasic polymeric material has a $T_g$ associated with the dominant phase of the material being above room temperature, it can be lathed into contact lenses at room temperature. "Dominant phase" is defined herein as a phase in a multiphasic material that determines the overall (bulk or working) hardness of a material.

The term "bonnet" or "single sided molded lens blank" refers to a polymeric button obtained by cast-molding or spin-casting from a lens-forming material in a mold, wherein at least one of the two opposite surfaces of the bonnet has an optically finished surface corresponding to one of the anterior and posterior surfaces of a contact lens. The term "optically finished" in reference to a surface or a zone in a surface refers to a surface of a contact lens or a zone in a surface of a contact lens, wherein the surface or zone does not need to undergo further processing, e.g., such as, polishing or lathing. One could also machine lenses from pseudo bonnets. A pseudo bonnet is a part that would require lathing of both sides of the material in order to obtain a contact lens. This type of part would allow for flexibility in the design of the front and back surfaces of a lens while minimizing material losses.

The invention is related to a method of making colored silicone-hydrogel contact lenses, in particular, MTO or customized colored silicone hydrogel contact lenses. A method of the invention comprises the steps of: providing a mold for molding a bonnet, wherein the mold includes a molding surface with optical quality, wherein the molding surface defines one of the posterior and anterior surface of a silicone hydrogel contact lens; applying a color coat to at least a portion of the molding surface of the mold with an ink, wherein the ink comprises at least one colorant and a silicone-containing polymer binder; curing the colored coat to form a colored film which is in contact with the molding surface but is not covalently attached to the molding surface; filling the mold with a lens-forming fluid material comprising at least one silicone-containing vinylic monomer or macromer and at least one hydrophilic vinylic monomer; letting the lens-forming material to soak the colored film for a period of time sufficient so that a portion of the lens-forming material penetrates into space between the colored film and the molding surface while detaching partially or completely the colored film from the molding surface; curing the lens-forming material in the mold to form a bonnet having a molded surface corresponding to one of the anterior and posterior surfaces of the contact lens, wherein the bonnet includes the colored film immobilized therein and/or thereon; removing the bonnet from the mold; post-curing and/or drying the bonnet for a time sufficient long to increase the lathability at room temperature of the bonnet; and forming the anterior or posterior surface by directly lathing of the bonnet on the side opposite to the molded surface, thereby obtaining the colored silicone hydrogel contact lens. Post curing and/or drying the bonnet could be performed with the bonnet on or off the mold.

In accordance with the invention, the ink typically comprises a colorant, a silicone-containing binder polymer, and optionally an adhesion promotor.

A solvent can be an organic or inorganic solvent, a mixture of several organic solvents, or a mixture of water and one or more water soluble or water miscible organic solvents. Any known suitable solvents can be used, so long as they can dissolve the binder in the ink of the invention and aid in the stability of the colorant. Exemplary solvents include, without limitation, water, acetone, alcohols (e.g., methanol, ethanol, propanol, isopropanol, 2-ethyoxyethanol, etc.), glycols, ketones, esters, cyclopentanone, cyclohexanone, tetrahydrofuran, acetone, methyl-2-pyrrolidone, dimethyl formamide, acetophenone, methylene dichloride, dimethyl sulfoxide, gamma-butyrolactone, ethylene dichloride, isophorone, o-dichlorobenzene, tetrahydrofuran, diacetone alcohol, methyl ethyl ketone, acetone, 2-nitropropane, ethylene glycol monoethyl ether, propylene carbonate, cyclohexanol, chloroform, trichloroethylene, 1,4-dioxane, ethyl acetate, ethyl lactate, ethylene glycol monobutyl ether, chlorobenzene, nitroethane, ethylene glycol monomethyl ether, butyl acetate, 1-butanol, methyl isobutyl ketone, nitromethane, toluene, ethanol, diethylene glycol, benzene, diethyl ether, ethanolamine, carbon tetrachloride, propylene glycol, hexane, ethylene glycol, and formamide.

A colorant can be a dye, or preferably a pigment. In general, dyes may not provide a highly opaque print that pigment can provide. Preferably, a colorant in an ink of the invention comprises at least one pigment. A colorant also may be a mixture of two or more pigments, which in combination provides a desired color, since any color can be obtained by merely mixing two or more primary colors together, As defined herein, "primary colors" mean cyan, yellow, magenta, white, and black. A colorant may also be a mixture of at least one pigment and at least one dye. A person skill in the art will know how to select colorants.

Non-Pearlescent Pigment(s) are preferably about 5 microns or smaller in size. Larger particles of a pigment can be ground into smaller particles. Any number of methods known in the art can be used to grind pigment. Exemplary preferred methods of reducing a pigment's particle size include high speed mixers, Kady Mills (rotor stator dispersion device), colloid mills, homogenizers, microfluidizers, sonalators, ultrasonic mills, roll mills, ball mills, roller mills, vibrating ball mills, attritors, sand mills, varikinetic dispensers, three-roll mills, Banbury mixers, or other methods well known to those of skill in the art. In the case of pearlescent pigments it is important during processing to minimize platelet breakage and maintain a sufficient level of dispersion. Pearlescent pigments require gentle handling during mixing and they should not be ground, or subjected to prolonged mixing, milling or high shear since such operations can damage the pigments. Particle size distribution, shape and orientation strongly influence final appearance. Milling, high shear mixing or prolonged processing of pearlscent pigments should be avoided since such operations might lead to delamination of metal oxide coated layer, fragmentation of platelets, platelet agglomeration and platelet compaction. Delamination of metal oxide, compaction, fragmentation and agglomeration will reduce pearlescent effects.

In accordance with the invention, a silicone-containing binder polymer should comprise crosslinkable groups selected from the group consisting of ethylenically unsaturated groups, hydroxyl —OH, amino —NHR (wherein R is hydrogen or $C_1$ to $C_8$ alkyl), carboxylic acid —COOH, epoxy, amide —CONHR, isocyanate, peroxy, perester, anhydride, alkoxysilane, silanol, acetoxysilane, silanes, halosilane, and combinations thereof. The ink may or may not contain an adhesion promoter, largely depending on the type of crosslinkable groups of a silicone-containing binder polymer to be used.

Where the silicone-containing binder polymer in an ink comprises ethylenically unsaturated groups as crosslinkable groups, a colored coat printed on the molding surface of a mold with the ink can be cured thermally or actinically to form a colored film. There is no need for an adhesion promoter. Examples of such silicone-containing binder polymer are ethylenically functionalized derivatives of silicon-containing polymers, as disclosed in commonly assigned U.S. Patent Application No. 60/564,024 filed Apr. 21, 2004 (herein incorporated by reference in its entirety). having pendant functional groups. The term "ethylenically functionalized" as used herein is intended to describe the introduction of ethylenically unsaturated groups into the silicone-containing polymer. The silicone-containing polymer to be ethylenically functionalized is preferably a copolymerization product of a polymerizable composition, which comprises (a) at least one hydrophilic vinylic monomer, (b) at least one functionalizing vinylic monomer containing at least one pendant functional groups, preferably selected from the group consisting of hydroxyl groups (—OH), primary amino groups (—$NH_2$), secondary amino groups (—NHR), tertiary amino groups might also with an appropriate reaction pair. For example a polymer containing tertiary amino groups could be alkylated with 3-bromopropyl methacrylate to form a quaternary ammonium salt. carboxylic groups (—COOH), epoxy groups, aldehyde groups (—CHO), amide groups (—$CONH_2$), acid halide groups (—COX, X=Cl, Br, or I), isothiocyanate groups, isocyanate groups, halide groups (—X, X=Cl, Br, or I), acid anhydride groups, and combinations thereof, and (c) at least one silicone-containing vinylic monomer or macromer. The polymerizable composition can also include a polymerization initiator (i.e., a photoinitiator or a thermal initiator), a solvent which is preferably the solvent used in an ink, and a chain transfer agent. Ethylenically functionalizing of the silicone-containing polymer is carried out by reacting the silicon-containing polymer with an ethylenically functionalizing agent which comprises an ethylencially unsaturated group and a group capable of reacting with the functional groups of the silicone-containing polymer to form covalent linkages, as known to person skilled in the art. Examples of preferred ethylenically functionalizing agents include, but are not limited to, glycidylmethacrylate, glycidylacrylate, 2-isocyanatoethylmethacrylate (IEM), N-hydroxymethylacrylamide (NHMA), acryloylchloride, methacrylolylchloride, methacrylic acid, acrylic acid, 2-bromoethylmethacrylate, and methacrylic anhydride.

Where the silicone-containing binder polymer in an ink comprises alkoxysilane, silanol, acetoxysilane, silanes, or halosilane groups as crosslinkable groups, a colored coat printed on the molding surface of a mold with the ink can be cured by moisture-activation. Alkoxysilane, acetoxysilane, silanes, or halosilane form silanols upon exposure to moisture. The silanols react with each other to form siloxane bonds. Therefore, polymer chains containing pendant silanol groups (or precursors) can combine to form crosslinks through the formation of siloxane linkages. Being moisture activated, the crosslinks would form during hydration of the polymer. The preferred latent crosslinkable pendant groups are halosilane and alkoxysilane, with alkoxysilane being the most preferred. Examples of silicone-containing binder polymer comprising alkoxysilane, silanol, acetoxysilane, silanes, or halosilane groups as crosslinkable groups are those disclosed in commonly assigned U.S. Patent Application Publication No. 2003/0054109 (herein incorporated by reference in its entirety). Such silicone-containing polymer is obtained by copolymerizing a polymerizable mixture comprising (A) a vinylic monomer having a latent crosslinkable group selected from the group consisting of alkoxysilane, silanol, acetoxysilane, silanes, or halosilane group and (B) a vinylic monomer free of groups coreactive with the latent crosslinkable group of monomer (A).

For example, a polymerizable mixture comprising a polymerizable halosilane or alkoxysilane compound and a vinylic monomer without active hydrogen atoms can be copolymerized thermally or actinically to form a silicone-containing binder polymer with alkoxysilane or halosilane groups as crosslinkable groups.

Examples of the polymerizable alkoxysilane compound include, but are not limited to: methacryloxyethyltri-methoxysilane, methacryloxyethylmethyldimethoxysilane, methacryloxyethyldi-methylmethoxysilane, methacryloxyethyltriethoxysilane, methacryloxyethyl-methyldiethoxysilane, methacryloxyethyldimethylethoxysilane, methacryloxypropyltrimethoxysilane, methacryloxypropylmethyldimethoxysilane, methacryl-oxypropyldimethylmethoxysilane, methacryloxypropyltriethoxysilane, methacryloxypropylmethyldiethoxysilane, methacryloxypropyldimethylethoxysilane, styryl-ethyltrimethoxysilane, and 3-(N-styrlmethyl-2-aminoethylamino) propyltri-methoxysilane hydrochloride. These compounds may be used alone or in combination as a mixture of two or more of them.

Examples of the polymerizable halosilane compound include, but are not limited to: methacryloxypropylmethyldichlorosilane, methacryloxypropyltrichloro-silane, 3-methacryloxypropyldimethylchlorosilane, and methacryloxyethyltri-chlorosilane.

Examples of a vinylic monomer without active hydrogen atoms include a N-vinyl heterocyclic monomers, such as N-vinyl-2-pyrrolidone (NVP); $C_1$ to $C_6$ alkyl vinyl ethers, such as vinyl ethyl ether; $C_1$ to $C_6$ alkyl ester of acrylic or methacrylic acid, such as methyl methacrylate and propyl acrylate; $C_1$ to $C_6$ alkyl styrene, such as t-butyl styrene; vinyl monomers, such as vinyl chloride and vinyl acetate; diene monomers, such as isoprene; N,N-dialkyl (meth)acrylamides or acrylamides (e.g., N,N-dimethyl acrylamide (DMA)); and $C_1$ to $C_6$ alkoxy $C_1$ to $C_6$ alkyl esters of acrylic or methacrylic acid, such as ethoxyethyl methacrylate (EOEMA) or methoxypropyl acrylate. These monomers may be used alone or in combination as a mixture of two or more of them.

Where a silicone-containing binder polymer in an ink comprises crosslinkable groups selected from the group consisting of hydroxyl group —OH, amino group —NHR (wherein R is hydrogen or $C_1$ to $C_8$ alkyl), carboxylic group —COOH, epoxy group, amide group —CONHR, and combinations thereof, it is preferably that an adhesion promoter is included in the ink. Examples of such silicone-containing binder polymer are those disclosed in a commonly-assigned copending U.S. patent application No. 60/558,461 filed Apr. 1, 2004 (herein incorporated by reference in its entirety). Such silicone-containing binder polymer can be a copolymerization product of a polymerizable mixture including: (i) at least one hydrophilic vinylic monomer; (ii) at least one functionalizing vinylic monomer containing at least one functional group selected from the group consisting of hydroxyl group —OH, amino group —NHR (wherein R is hydrogen or $C_1$ to $C_8$ alkyl), carboxylic group —COOH, epoxy group, amide group —CONHR, and combinations thereof; and (iii) at least one silicone-containing vinylic monomer or macromer. one or more components selected from the group consisting of a polymerization initiator (i.e., a photoinitiator or a thermal initiator), a chain transfer agent, and a solvent. The polymerizable mixture can also include a polymerization initiator (i.e., a photoinitiator or a thermal initiator), a solvent which is preferably the solvent used in an ink, and a chain transfer agent. The polymerizable mixture can optionally include a hydrophobic vinylic monomer, for example, such as, 2-ethoxyethylmethacrylate (EOEMA).

Examples of siloxane-containing vinylic monomers include, without limitation, methacryloxyalkylsiloxanes, 3-methacryloxy propylpentamethyldisiloxane, bis(methacryloxypropyl)tetramethyl-disiloxane, monomethacrylated polydimethylsiloxane, mercapto-terminated polydimethylsiloxane, N-[tris(trimethylsiloxy)silylpropyl]acrylamide, N-[tris(trimethylsiloxy)silylpropyl]methacrylamide, tris(pentamethyldisiloxyanyl)-3-methacrylatopropylsilane (T2), and tristrimethylsilyloxysilylpropyl methacrylate (TRIS). A preferred siloxane-containing monomer is TRIS, which is referred to 3-methacryloxypropyltris(trimethylsiloxy) silane, and represented by CAS No. 17096-07-0. The term "TRIS" also includes dimers of 3-methacryloxypropyltris(trimethylsiloxy) silane.

Any know suitable siloxane-containing macromer can be used. A particularly preferred siloxane-containing macromer is selected from the group consisting of Macromer A, Macromer B, Macromer or C, and Macromer D described in U.S. Pat. No. 5,760,100, herein incorporated by reference in its entirety.

Nearly any hydrophilic vinylic monomer can be used in the invention. Suitable hydrophilic monomers are, without this being an exhaustive list, hydroxyl-substituted lower alkyl ($C_1$ to $C_8$) acrylates and methacrylates, acrylamide, methacrylamide, (lower allyl)acrylamides and -methacrylamides, ethoxylated acrylates and methacrylates, hydroxyl-substituted (lower alkyl)acrylamides and -methacrylamides, hydroxyl-substituted lower alkyl vinyl ethers, sodium vinylsulfonate, sodium styrenesulfonate, 2-acrylamido-2-methylpropanesulfonic acid, N-vinylpyrrole, N-vinyl-2-pyrrolidone, 2-vinyloxazoline, 2-vinyl4,4'-dialkyloxazolin-5-one, 2- and 4-vinylpyridine, vinylically unsaturated carboxylic acids having a total of 3 to 5 carbon atoms, amino(lower alkyl)-(where the term "amino" also includes quaternary ammonium), mono(lower alkylamino)(lower alkyl) and di(lower alkylamino)(lower alkyl)acrylates and methacrylates, allyl alcohol and the like. Among the preferred hydrophilic vinylic monomers are N,N-dimethylacrylamide (DMA), 2-hydroxyethylmethacrylate (HEMA), hydroxyethyl acrylate (HEA), hydroxypropyl acrylate, hydroxypropyl methacrylate (HPMA), trimethylammonium 2-hydroxy propylmethacrylate hydrochloride, dimethylaminoethyl methacrylate (DMAEMA), glycerol methacrylate (GMA), N-vinyl-2-pyrrolidone (NVP), dimethylaminoethylmethacrylamide, acrylamide, methacrylamide, allyl alcohol, vinylpyridine, N-(1,1dimethyl-3-oxobutyl)acrylamide, acrylic acid, and methacrylic acid.

Any know suitable vinylic monomer containing at least one functional group selected from the group consisting of hydroxyl group —OH, amino group —NHR (wherein R is hydrogen or $C_1$ to $C_8$ alkyl), carboxylic group —COOH, epoxy group, amide group —CONHR, and combinations thereof can be used as functionalizing vinylic monomer in the present invention. Preferred examples of such vinylic monomers includes methacrylic acid (MAA), acrylic acid, glycidylmethacrylate, glycidylacrylate, HEMA, HEA, and N-hydroxymethylacrylamide (NHMA).

It should be understood that a vinylic monomer can be used both as a hydrophilic vinylic monomer and as a functionalizing vinylic monomer in the polymerizable composition for preparing the silicone-containing polymer with pendant functional groups. Preferably, the hydrophilic vinylic monomer is devoid of functional groups (e.g., DMA, NVP).

Any known suitable chain transfer agent can be used in the present invention. Examples of preferred chain transfer agent includes mercaptoethane, mercaptoethanol, ethanedithiol, propanedithiol, and mercapto-terminated polydimethylsiloxane.

In accordance with the invention, copolymerization reaction for preparing a binder polymer can be initiated by heat or actinic radiation (e.g., UV) in a polymerizable mixture which includes a solvent (e.g, ethanol or cyclopentanone), a thermal initiator (e.g., AIBN) or a photoinitiator, a chain transfer agent (e.g., ethyl mercaptan (EtSH)), a hydrophilic vinylic monomer devoid of functional groups (e.g. DMA), a functionalizing vinylic monomer having at least one functional groups (e.g. HEMA, MM, or glycidylmethacrylate), an alkoxysilane monomer (e.g. TRIS), and monomethacrylated polydimethylsiloxane. It might be preferable the polymerization reaction is not complete, thereby producing a binder polymer dissolved in a solvent which preferably contains some residual unreacted vinylic monomers. Polymerization mixtures that contain only binder and unconverted monomer might also be desirable since solvent would be eliminated. The unconverted monomer can be used to help control rheological properties of inks and be converted to polymer during ink cure and/or bonnet curing. A person skilled in the art will known well how to control polymerization level.

A silicone-containing binder polymer can also be a polyurethane and/or polyurea polymer having at least two functional groups which can be hydroxyl, amino (primary or secondary), isocyanato groups. A silicone-containing polyurethane/polyurea binder polymer can be prepared by reacting (polymerizing) of a mixture containing: (a) at least one σ,ω-dihydroxyl alkyl end-capped polysiloxane, (b) optionally at least one amino- or hydroxyl-terminated poly(alkylene oxide) (e.g., poly(oxyalkylene)diamine, or polyalkyleneglycol), (c) optionally at least one compound having at least two hydroxy or amino (primary or secondary) groups, (d) at least one diisocyanate, and (e) optionally a polyisocyanate.

Di-hydroxy-capped polysiloxanes can be synthesized according to any known process, for example, by reacting a disiloxane or dimethoxydimethylsilane or diethoxy dimethyl silane with cyclopolydimethyl siloxane under acidic conditions. Examples of aminoalkyl polyalkyleneglycol are so-called Jeffamines® compounds. Exemplary poly(alkylene glycol)s include, but are not limited to a poly(ethylene glycol), a poly(propylene glycol), a poly(ethylene glycol)/poly(propylene glycol) block polymer, a poly(ethylene glycol)/poly(propylene glycol)/poly(butylene glycol) block polymer, a polytetrahydrofuran, a poloxamer, and mixtures thereof.

An "adhesion promoter" refers to a compound (or crosslinker) comprising two or more functional groups. A crosslinker molecule can be used to crosslink two or more monomers or polymer molecules. Many different crosslinking reactions could be used to cause chemical bonding between different binder polymer molecules to entrap the pigmented particles. Most crosslinkers are identified by bi- or multi-functional reactive groups. For example, diphenolic, diepoxide, dimelamine, diisocyanate, or dialdehyde resins could be used. Multi-functional phenolics have structures as follows: $(HOH_2CPh)_n$—$R_9$, where Ph is a phenol group. Multi-functional epoxides have structures as follows: $(CH_2OCH)_n$—$R_9$. Multi-functional aldehydes have the following structure: $(HCO)_n$—$R_9$ or $(CH_3CO)_n$—$R_9$. Multi-functional isocyanates have the following structure: $(OCN)_n$—$R_9$. Melamine resins have the following structure: $(HOH_2C-Mel)_n$—$R_9$, where Melamine is

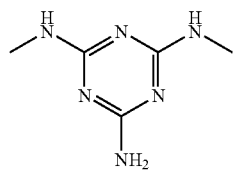

For the above examples, $R_9$ may be a aliphatic, alicyclic, aliphatic-alicyclic, aromatic, aliphatic-aromatic hydrocarbon, vinyl alcohol, vinyl butyral, or vinyl acetate, and n is a number greater than 1. Mixed functional groups could be used (i.e. an epoxide with an isocyanate).

Exemplary isocyanate compounds include hexamethylene diisocyanate (HMDI), 2,4-toluene diisocyanate, isophoronediisocyanate and bis(isocyanato pheyl)methane.

Exemplary epoxide-containing groups include bisphenol-A propoxylate (1 PO/phenol) diglycidyl ether, diepoxide, and epichlorhydrin.

In accordance with the invention, an ink can also comprise one or more components selected from the group consisting of a thermal initiator, a photoinitiator, a dliluent, a surfactant, a humectant, an antimicrobial agent, an antioxidant agent, an anti-coagulating agent, and other additives known in the art.

In accordance with the invention, a diluent can be a solvent or a solution of one or more vinylic monomers.

An ink to be used in the invention should have a good adhesion to a silicone hydrogel contact lens. As used herein, "good adhesion to a contact lens or a silicon hydrogel contact lens" in reference to a colored coat or an ink means that the colored coat (with a color image) generated on the lens with the ink can pass at least a finger rubbing test, preferably pass the finger rubbing test and a sonication-in-methanol (or other suitable solvent, e.g., such as isopropanol) surviving test.

The finger rubbing test is performed by removing the hydrated contact lens from a packaging solution, e.g., saline, and digitally rubbing the lens between either two fingers or a finger and a palm for up to about 10 seconds. Visible and microscopic (~10×) observation of colorant bleeding, smearing, or delamination indicates failure of the rub test.

The sonication-in-methanol (or other suitable solvent, e.g., such as isopropanol) test is performed as follows. A colored contact lens is immersed in 5 ml of, for example, methanol or isopropanol or a suitable solvent, sonicated for about 1 minute and then placed in a vial containing borate buffered saline (BBS). After about 10 seconds, the saline is drained and about 5 ml of fresh BBS is added. After equilibrating for about 5 minutes in the BBS, the lens is inspected for signs of adhesion failure (e.g., colorant bleeding, smearing, or delamination).

A mold for molding a bonnet can be an assembly or a cup, as known to a person skilled in the art. A mold for molding a bonnet is preferably made of a plastic material. Preferably, at least a portion of the molding surface of the mold is pretreated to increase its hydrophilicity or wettability in a manner well-known in the art. For example, at least a portion or all of the molding surface of the mold is subjected to a corona treatment prior to its use in order for the molded bonnet (or single-sided molded lens blank) to adhere preferentially to the molding surface for subsequent processes (e.g., lathing). A person skilled in the art knows how to make molds for cast-molding polymer bonnet (or single-sided molded lens blank). It is understood that the surface opposite of the optically finished surface of the bonnet can be flat or curved, preferably is a convex hemispherical surface.

In a preferred embodiment, the first molding surface with optical quality of the first mold half defines the posterior surface of a contact lens to be made. Only one side (the anterior surface) of lens and lens edge need to be lathed from a bonnet.

It should be understood that spin-casting well known to a person skilled in the art can be used to produce a bonnet. In the fabrication of bonnet by spin casting, the lens-forming material is placed in the mold cavity having an optical concave surface (molding surface) wetted by said material, and then intermittently and forced fed, one at a time, into the inlet end of a rotating polymerization column which desirably comprises a "conditioning" zone near the inlet end and a polymerization reaction zone toward the outlet end. It is preferred that the molds be characterized by a pretreated optical surface to increase its hydrophylicity or wettability in a manner well-know in the art. The speed of rotation of the tube and the molds, when secured in interference fitting relationship, is adjusted to cause and/or maintain radially outward displacement of the lens-forming material to a predetermined lens configuration which when subjected to the polymerization conditions employed in the tube will form the desired shaped contact lens. Rotational speed of, for example, 300 r.p.m., and lower to 600 r.p.m., and higher, can be conveniently used. The precise rotational speed to employ in the operation is, of course, well within the skill of the artisan. Factors to be considered include the type and concentration of the components comprising the lens-forming material employed, the operative conditions of choice, the type and concentration of initiator, and/or the intensity and type of energy source to initiate polymerization, and factors discussed previously and readily apparent to the artisan.

A person skilled in the art knows well that the polymerization column (tube), as typically used in spin casting, has to be fabricated from a material that will not impede the transmission of the actinic radiation into the polymerization zone of the column. Glass, such as PYREX, would be a suitable material for the polymerization column when using long wavelength U.V. light as actinic radiation. When using other types of actinic radiation as recited above, the polymerization column could be fabricated from various types of metals such as steel, nickel, bronze, various alloys, and the like.

In accordance with the invention, an ink can be applied to a molding surface of a mold according to any printing technologies, such as, for example, pad transfer printing (or pad printing), or inkjet printing. It is understood that other types of printing technologies could also be used to print molds.

In pad-transfer printing, a color image is placed or printed on a pad transfer device and the image on the pad transfer device is transferred to another surface, such as a polymer or lens (U.S. Pat. No. 3,536,386 to Spivack; U.S. Pat. No. 4,582,402 and U.S. Pat. No. 4,704,017 to Knapp; U.S. Pat. No. 5,034,166 to Rawlings et al., herein incorporated by reference in their entireties). A typical example of this printing follows. An image is etched into metal to form a cliché. The cliché is placed in a printer. Once in the printer, the cliché is inked by either an open inkwell doctoring system or by a closed ink cup sliding across the image. Then, a silicone pad picks up the inked image from the cliché and transfers the image to the contact lens or mold. The silicone pads are made of a material comprising silicone that can vary in elasticity. The properties of the silicone material permit the inks to stick to the pad temporarily and fully release from the pad when it contacts a contact lens or a mold. Appropriate pad-transfer printing structures include, but are not limited to, Tampo-type printing structures (Tampo vario 90/130), rubber stamps, thimbles, doctor's blade, direct printing, or transfer printing as they are known in the art.

Inks for pad printing operations will preferably have one or more of the following characteristics: viscosity lower than about 50,000 cps, preferably lower than about 5000 cps and most preferably below 1500 cps, particle size less than about 5 micrometer (for non-pearlescent pigment), surface tension from about 20 mN/m to about 60 mN/m; prolonged stability (i.e., stable for about 4 hours, preferably at least 8 hours, more preferably 24 hours, even more preferably at least 7 days, most preferably at least three weeks); an appropriate color level (visible by eye); good adhesion to medical devices; and good transfer from a mold to a medical device made in the mold. The physical stability of an ink could differ from its chemical stability. For example, pigments might settle from the ink (physical phenomenon) yet the ink may not have undergone any significant chemical reaction. For such situations the ink can be restored to a useable state by simply stirring or remixing. Other means of slowing or eliminating settling of pigment include but are not limited to use of additives, altering pH, in-line mixing, refrigeration, altering particle size of pigments, and coating pigment of pigment particles.

Printing a lens using an inkjet printing process is described in published U.S. patent application Nos. 2001/0050753, 2001/0085934, 2003/0119943, and 2003/0184710, herein incorporated by references in their entireties.

For ink jet applications, the ink of the invention has one or more of the following characteristics: a viscosity lower than about 50 centipoise (cps), preferably lower than about 15 cps; most preferably below 15 cps; a surface tension of from about 20 mN/m to about 60 mN/m; a particle size of less than about 5 µm; prolonged stability (i.e., stable for at about 4 hours, preferably at least 8 hours, more preferably at least 24 hours, even more preferably at least 7 days, most preferably at least three weeks); an appropriate color level (visible by eye); uniform drop formation (i.e., no "coffee stain" or "donut" effects); jet stability (i.e., ease of formation of individual drops); good adhesion to medical devices; good transfer from a mold to a medical device made in the mold; and stability of ink in inkjet nozzles (minimal drying or crusting effects).

"Coffee stain appearance" or "coffee stain effect", as used herein, means that a color dot on a contact lens or a mold has a peripheral edge having a dark color and the interior area having light color.

"Donut appearance" or "donut effect", as used herein, means that a color dot on a contact lens or a mold has a light-colored or colorless central zone surrounded by a dark-colored annular zone.

In accordance with the invention, any ink curing methods known to a person skilled in the art can be used in the invention. Examples of ink curing methods include without limitation thermal curing, actinic curing (i.e., by actinic radiation), moisture curing, curing by using a chemical means, such as, for example, nucleophilic reactions, or oxidation reactions.

In accordance with the present invention, a lens-forming fluid material can be a solution or a solvent-free liquid or melt at a temperature below 60° C.

In accordance with the present invention, a lens-forming fluid material can be any formulations for making soft contact lenses. Exemplary formulations include without limitation the formulation of lotrafilcon A, lotrafilcon B, etafilcon A, genfilcon A, lenefilcon A, polymacon, acquafilcon A, and balafilcon.

Where a lens-forming fluid material is a solution, it can be prepared by dissolving at least one silicone-containing vinylic monomer or macromer and at least one hydrophilic vinylic monomer and all other desired components in any suitable solvent known to a person skilled in the art, for example, including those described above.

In accordance with the present invention, any know suitable silicone-containing macromer, such as, for example those disclosed above, can be used to prepare soft contact lenses. Any known suitable silicone-containing vinylic monomers, such as, for example, those described above, can be used to prepare soft contact lenses.

Examples of suitable hydrophilic monomers are those described above.

In a preferred embodiment, a lens-forming material is a composition capable of forming a silicone hydrogel which has a room temperature lathability, i.e., having a predominant glass transition temperature ($T_g$) of about 25° C. or higher.

In a more preferred embodiment, a lens-forming material is a solvent-free polymerizable composition disclosed in a commonly assigned U.S. patent application No. 60/583,994 filed Jun. 30, 2004 (herein incorporated by reference. Such solvent free polymerizable composition comprises (a) at least one silicone-containing vinylic monomer or macromer or mixture thereof, (b) at least one hydrophilic vinylic monomer, and (c) at least one blending vinylic monomer in an amount sufficient to dissolve both hydrophilic and hydrophobic components of the polymerizable composition.

A "blending vinylic monomer" refers to a vinylic monomer which can function both as a solvent to dissolve both hydrophilic and hydrophobic components of a lens-forming material and as one of polymerizable components to be polymerized to form a silicone hydrogel material. Preferably, the blending vinylic monomer is present in the lens-forming material in an amount of from about 5% to about 30% by weight.

Any suitable vinylic monomers, capable of dissolving both hydrophilic and hydrophobic components of a lens-forming material to form a solution, can be used. Preferred examples of blending vinylic monomers include, without limitation, aromatic vinylic monomers, cycloalkyl-containing vinylic monomers. Those preferred blending monomers can increase the predominant glass transition temperature of a silicone hydrogel material prepared by curing a polymerizable composition containing those preferred blending monomer.

Examples of preferred aromatic vinylic monomers include styrene, 2,4,6-trimethylstyrene (TMS), t-butyl styrene (TBS), 2,3,4,5,6-pentafluorostyrene, benzylmethacrylate, divinylbenzene, and 2-vinylnaphthalene. Of these monomers, a styrene-containing monomer is preferred. A styrene-containing monomer is defined herein to be a monomer that contains a vinyl group bonded directly to a phenyl group in which the phenyl group can be substituted by other than a fused ring, e.g., as above with one to three $C_1$–$C_6$ alkyl groups. Styrene itself [$H_2C=CH—C_6H_5$] is a particularly preferred styrene-containing monomer.

A cycloalkyl-containing vinylic monomer is defined herein to be a vinylic monomer containing a cycloalkyl which can be substituted by up to three $C_1$–$C_6$ alkyl groups. Preferred cycloalkyl-containing vinylic monomers include, without limitation, acrylates and methacrylates each comprising a cyclopentyl or cyclohexyl or cycloheptyl, which can be substituted by up to 3 $C_1$–$C_6$ alkyl groups. Examples of preferred cycloalkyl-containing vinylic monomers include isobornylmethacrylate, isobornylacrylate, cyclohexylmethacrylate, cyclohexylacrylate, and the like.

A lens-forming material preferably further includes one or more Tg-enhancing vinylic monomers selected from the group consisting of acrylic acid, $C_1$–$C_4$ alkyl methacrylate (e.g., methylmethacrylate, ethylmethacrylate, propylmethacrylate, isopropylmethacrylate, t-butylmethacrylate), methacrylonitrile, acrylonitrile, $C_1$–$C_4$ alkyl acrylate, N-isopropyl acrylamide, 2-vinylpyridine, and 4-vinylpyridine. It is understood that aromatic monomers and/or cycloalkyl-containing vinylic monomers can be replaced by one or more of the above Tg-enhancing vinylic monomers.

In accordance with the present invention, a lens-forming material can further comprise various components, such as cross-linking agents, hydrophobic vinylic monomers, initiator, UV-absorbers, inhibitors, fillers, visibility tinting agents, antimicrobial agents, and the like.

Cross-linking agents may be used to improve structural integrity and mechanical strength. Examples of cross-linking agents include without limitation allyl(meth)acrylate, lower alkylene glycol di(meth)acrylate, poly lower alkylene glycol di(meth)acrylate, lower alkylene di(meth)acrylate, divinyl ether, divinyl sulfone, di- or trivinylbenzene, trimethylolpropane tri(meth)acrylate, pentaerythritol tetra(meth)acrylate, bisphenol A di(meth)acrylate, methylenebis(meth)acrylamide, triallyl phthalate or diallyl phthalate. A preferred cross-linking agent is ethylene glycol dimethacrylate (EGDMA).

The amount of a cross-linking agent used is expressed in the weight content with respect to the total polymer and is in the range from 0.05 to 20%, in particular in the range from 0.1 to 10%, and preferably in the range from 0.1 to 2%. If the cross linking agent is a polydimethylsiloxane, or block copolymer of polydimethylsiloxane, the weight percentage in the formulation might be in the range of 30–50% since such a material will be present to enhance oxygen permeability.

Initiators, for example, selected from materials well known for such use in the polymerization art, may be included in the lens-forming fluid material in order to promote, and/or increase the rate of, the polymerization reaction.

Suitable photoinitiators are benzoin methyl ether, diethoxyacetophenone, a benzoylphosphine oxide, 1-hydroxycyclohexyl phenyl ketone and Darocur and Irgacur types, preferably Darocur 1173® and Darocur 2959®. Examples of benzoylphosphine initiators include 2,4,6-trimethylbenzoyidiphenylophosphine oxide; bis-(2,6-dichlorobenzoyl)-4-N-propylphenylphosphine oxide; and bis-(2,6-dichlorobenzoyl)-4-N-butylphenylphosphine oxide.

Reactive photoinitiators which can be incorporated, for example, into a macromer or can be used as a special monomer are also suitable. Examples of reactive photoinitiators are those disclosed in EP 632 329, herein incorporated by reference in its entirety. The polymerization can then be triggered off by actinic radiation, for example light, in particular UV light of a suitable wavelength. The spectral requirements can be controlled accordingly, if appropriate, by addition of suitable photosensitizers Examples of suitable thermal initiators include, but are not limited to, 2,2'-azobis(2,4-dimethylpentanenitrile), 2,2'-azobis(2-methylpropanenitrile), 2,2'-azobis(2-methylbutanenitrile), peroxides such as benzoyl peroxide, and the like. Preferably, the thermal initiator is azobisisobutyronitrile (AIBN).

Without limiting this invention to any particular mechanism or theory, it is believed that a colored film is immobilized in the lens blank through encapsulation and/or interpenetrating polymer network formation. By allowing the colored film with a color image to soak in the lens formulation prior to curing, one can obtain a lens blank in which the print is flush with or below the molded surface (front or base curve). The depth of the printed image in the lens blank will likely depend on soak time, temperature, lens formulation, ink formulation and surface characteristics (e.g. corona versus non-corona treated surface) of the single sided mold assembly and possibly the density of the printed image and the lens formulation. Magnetic fields could also (at least in principle) be used to position printed images at various depths within a non-cured polymer. This could be accomplished by incorporating magnetic materials in ink formulations and or lens formulations. The colored film is soaked with the lens-forming material preferably for at least 5 minutes, more preferably for at least 10 minutes and even more preferably for at least 20 minutes. The methods of embedding an image in a silicone hydrogel lens could be applied to both SINGLE sided AND DOUBLE sided moldings.

Curing of a lens-forming material can be initiated thermally or actinically.

The step of post-curing and/or drying is preferably performed at a high temperature, for example, such as, at a temperature of about 75° C. or higher. By having a step of post-curing and/or drying, it is believed that residual unpolymerized monomers and/or macromers in a bonnet can be further polymerized and that solvent if applicable can be removed. As such, the hardness of the resultant polymer is increased so that the lathability at room temperature of the resultant polymer is achieved. The drying of the resultant polymer can be further facilitated by carrying it out at a high temperature and under reduced pressure.

Post-curing of the resultant polymer can also be facilitated by adding a high temperature initiator, which is activated only at elevated temperature (i.e., above curing temperatures in the step of curing to form bonnets), in the lens-forming fluid material. By adding a high-temperature initiator in the lens-forming fluid material, one may be able to completely polymerize, during the step of post-curing and/or drying, any residual polymerizable components left after curing step, to increase the hardness of the resultant silicone hydrogel material to be lathed. In addition, the high-temperature initiator(s) could also function as to increase cross-link density and hardness during the step of post-curing and/or drying. Examples of suitable high temperature initiators include without limitation VAZO-88 from Dupont, 2,5-bis(ter-butylperoxy)-2,5-dimethylhexane, benzoylperoxide, cumene hydroperoxide, ter-butyl peroxide, ter-butyl hydroperoxide, and ter-butyl peracetate.

Preferably, lathing of a bonnet is performed at room temperature. Any known suitable lathe apparatus can be used in this invention. Preferably, a computer controllable (or numerically controlled) lathe is used in the invention. More preferably, a numerically controlled two-axis lathe with a 45° piezo cutter or a lathe apparatus disclosed by Durazo and Morgan in U.S. Pat. No. 6,122,999, herein incorporated by reference in its entirety, is used in the invention. Exemplary preferred lathe apparatus include without limitation numerically controlled lathes from Precitech, Inc., for example, such as Optoform ultra-precision lathes (models 30, 40, 50 and 80) having Variform piezoceramic fast tool servo attachment.

The invention will allow MTO or customized silicone hydrogel lenses with printed images on or below lens surfaces to be produced by lathing at room temperature. Colored silicone hydrogel lenses produced according to the invention will be useful as daily wear lenses and extended wear lenses. The lenses will allow alteration or enhancement of a patient's eye color. This could be accomplished with one or more prints on a lens. The inks used in printing could be clear or opaque. In addition, the lenses could also be used as prosthetic lenses. The process for positioning a printed image below a lens surface will result in improved comfort as compared to prints on lens surfaces. The invention will enable one to lathe a printed lens blank to any desired prescription or lens design. The ability to lathe printed silicone hydrogel lens blanks into lenses with ordinary lathing equipment (i.e., no cryogenic technology involved) will allow colored silicone hydrogel lenses to be available in a wider variety of parameters (ordinary or extreme parameters) and lens designs (e.g. toric, bifocal).

It is understood that a method of the invention can be used to produce breathable, non-permanent body art. For example one could impart a desired image on a silicone copolymer and then fasten the image to a person. There are some advantages of such body art as compared to permanent tattoos, including, for example, easiness for removal if desired, good durability, good oxygen permeability/breathability, ability to mask scars or other disfiguring appearances.

It should be understood that any known inks for making non-silicone hydrogel lenses can also be (but not preferred) used in the invention.

The invention, in a different aspect, provides a method of making colored silicone-hydrogel contact lenses, the method comprising: providing a mold for cast-molding of a bonnet, wherein the mold includes a molding surface with optical quality, wherein the molding surface defines one of the posterior and anterior surface of a silicone hydrogel contact lens; applying a color coat to at least a portion of the molding surface of the mold with an ink, wherein the ink comprises at least one colorant and a polymer binder, wherein the binder polymer comprises segments derived from at least one hydrophilic vinylic monomer or macromer; optionally curing the colored coat to form a colored film which is not covalently attached to the molding surface; filling the mold with a lens-forming fluid material comprising at least one silicone-containing vinylic monomer or macromer and at least one hydrophilic vinylic monomer; curing the lens-forming material in the mold to form a bonnet having a molded surface corresponding to one of the anterior and posterior surfaces of the contact lens, wherein the bonnet includes the colored coat or film immobilized therein and/or thereon, wherein the molded surface of the bonnet includes at least a portion of the colored coat or film; removing the bonnet from the mold; post-curing and/or drying the bonnet for a time sufficient long to increase the lathability at room temperature of the bonnet; and forming the anterior or posterior surface by directly lathing of the bonnet on the side opposite to the molded surface, thereby obtaining the colored silicone hydrogel contact lens.

In accordance with the invention, the binder polymer in the ink should comprise crosslinkable groups selected from the group consisting of ethylenically unsaturated groups, hydroxyl —OH, amino —NHR (wherein R is hydrogen or $C_1$ to $C_8$ alkyl), carboxylic acid —COOH, epoxy, amide CONHR, isocyanate, peroxy, perester, anhydride, alkoxysilane, silanol, acetoxysilane, silanes, halosilane, and combinations thereof.

Preferably, the colored coat on the molding surface of the mold is cured to form a colored film.

The previous disclosure will enable one having ordinary skill in the art to practice the invention. In order to better enable the reader to understand specific embodiments and the advantages thereof, reference to the following examples is suggested. The percentages in the formulations are based on weight percentages unless otherwise specified.

EXAMPLE 1

This example describes synthesis of a precursor to a photo-curable binder polymer and synthesis of a photo-curable binder polymer.

Synthesis of a Silicone-Containing Polymer Having Pendant Functional Groups

A 1 liter jacketed glass reaction kettle is charged with a solution consisting of VAZO-64 (0.6472 grams), DMA (106.09 g), TRIS (106.26 g), mercaptoethanol (0.253 g), HEMA (37.55 g) and ethylacetate (301.9 g). Nitrogen is bubbled through the mixture for about 15 minutes at room temperature and then the mixture is heated to 40° C. and stirred at about 200 RPM. After about 16 hours, the reaction mixture becomes noticably more viscous. The reaction is monitored by FT-IR analysis. After a total reaction time of about 20 hours, a solution consisting of 11 mg 4-hydroxy-TEMPO (4-Hydroxy-2,2,6,6-Tetramethylpiperidinyloxy, free radical) and 2.38 grams of ethylacetate is added to the reaction mixture. Gravimetric analysis of the reaction mixture indicates that the solution has a solids content of about 68%.

FT-IR analysis: A several drops of a reaction mixture are placed in about 15 mL of hexanes and the resulting precipitate is separated from the hexanes and dissolved in absolute ethanol. A film is cast on a NaCl disk and dried at 75° C. for about 5 minutes (or at 100° C. for about 10 minutes). Characteristic peaks of amide and ester and hydroxy functionality at 1643.7 and 1724.4 cm$^{-1}$ respectively are monitored.

Preparation of Photo-Curable Binder Polymer

To 150.17 grams of a 68% solution of a silicone-containing polymer (a precursor prepared above) in ethyl acetate is added a solution consisting of 18.8029 grams of 2-isocyanatoethylmethacrylate (IEM) and 0.0035 grams of 4-hydroxy-TEMPO. The mixture is stirred with a spatula at room temperature until homogenous and then checked by FT-IR. 0.0705 grams of Dibutyltindilaurate (DBTDL) is then stirred into the reaction mixture. The reaction mixture is heated at 35° C. for about 45 minutes at which point NCO is no longer present by FT-IR.

EXAMPLE 2

Synthesis of Silicone-containing Macromer 51.5 g (50 mmol) of the perfluoropolyether Fomblin® ZDOL (from Ausimont S.p.A, Milan) having a mean molecular weight of 1030 g/mol and containing 1.96 meq/g of hydroxyl groups according to end-group titration is introduced into a three-neck flask together with 50 mg of dibutyltin dilaurate. The flask contents are evacuated to about 20 mbar with stirring and subsequently decompressed with argon. This operation is repeated twice. 22.2 g (0.1 mol) of freshly distilled isophorone diisocyanate kept under argon are subsequently added in a counterstream of argon. The temperature in the flask is kept below 30° C. by cooling with a waterbath. After stirring overnight at room temperature, the reaction is complete. Isocyanate titration gives an NCO content of 1.40 meq/g (theory: 1.35 meq/g).

202 g of the α,ω-hydroxypropyl-terminated polydimethylsiloxane KF-6001 from Shin-Etsu having a mean molecular weight of 2000 g/mol (1.00 meq/g of hydroxyl groups according to titration) are introduced into a flask. The flask contents are evacuated to approx. 0.1 mbar and decompressed with argon. This operation is repeated twice. The degassed siloxane is dissolved in 202 ml of freshly distilled toluene kept under argon, and 100 mg of dibutyltin dilaurate (DBTDL) are added. After complete homogenization of the solution, all the perfluoropolyether reacted with isophorone diisocyanate (IPDI) is added under argon. After stirring overnight at room temperature, the reaction is complete. The solvent is stripped off under a high vacuum at room temperature. Microtitration shows 0.36 meq/g of hydroxyl groups (theory 0.37 meq/g).

13.78 g (88.9 mmol) of 2-isocyanatoethyl methacrylate (IEM) are added under argon to 247 g of the α,σ-hydroxypropyl-terminated polysiloxane-perfluoropolyether-polysiloxane three-block copolymer (a three-block copolymer on stoichiometric average, but other block lengths are also present). The mixture is stirred at room temperature for three days. Microtitration then no longer shows any isocyanate groups (detection limit 0.01 meq/g). 0.34 meq/g of methacryl groups are found (theory 0.34 meq/g).

The macromer prepared in this way is completely colourless and clear. It can be stored in air at room temperature for several months in the absence of light without any change in molecular weight.

EXAMPLE 3

DMA, macromer prepared in Example 2, TRIS, t-butyl styrene, and VAZO-52 are mixed to prepare a solvent free formulation shown in Table 1 for making room temperature lathable silicone hydrogel materials. t-butyl styrene is added in a formulation to ensure miscibility of all components in the absence of solvent (e.g., ethanol) and to enhance lathing characteristics (increaed $T_g$) of the polymer.

TABLE 1

| Components | Formulation (% by weight) |
| --- | --- |
| DMA | 33.72 |
| Macromer* | 37.91 |
| TRIS | 18.12 |
| t-butylstyrene | 9.99 |
| VAZO-52 | 0.253 |

*Prepared in Example 2.

EXAMPLE 4

A photocurable ink is prepared by mixing 22.64 grams of the binder poymer A with 1.38 grams of PCN-green, and 0.0581 grams of Irgacure 2959 dissolved in 1.5 grams of ethyl acetate. The ink has a Brookfield viscosity of about 680 cps at 25° C.

EXAMPLE 5

Printed lens blanks (or bonnets) are prepared as follows:
Clichés are inked with an photo-curable silicone hydrogel ink prepared in Example 4 and a silicone rubber print pad is used to transfer iris like images to polypropylene male (base curve) mold halves (FreshLook®). The base curve mold halves are corona treated (33 dynes) prior to printing. The mold halves are then placed in a UV-cure box fitted with ultraviolet-B lights in top section (Phillips TL 40 W/12 RS). Samples are irradiated for about 90 minutes with UV-B light from top (intensity ~3.6 mW/cm$^2$) (optionally UV-A light can be used too). The bottom section of the cure box was fitted with Phillips 40 watt F40BL lights. The base curve mold halves with printed and cured ink are then placed in plastic wells containing about 0.75 mL of silicone hydrogel lens formulation prepared in Example 3. Base curve mold halves are leveled by sandwiching mold assemblies (consisting of a male mold half and a plastic well) between two flat plastic plates. After about a 30 minute soak time, mold assemblies are placed in a forced air oven and lens polymer is cured thermally. The cure schedule used is given in Table 2.

TABLE 2

| Ramp | Cure Temp/Cure Time |
| --- | --- |
| 10 min ramp from set point of 45° C. | 75° C./2 hours |
| 10 minute ramp from 75° C. | 110° C./1 hour |
| Post Cure | Post Cure Temp/Post Cure Time |
| Preheat oven to 110° C. | 110° C./16 hours |

Note:
Base curve molds are removed from plastic wells prior to post cure operation.

After curing, printed lens blanks on polypropylene base curve molds are obtained. A lens blank is removed from a polypropylene base curve mold and analyzed. Inspection of lens blanks shows that the print pattern is below the molded base curve surface of the lens blank (i.e., print pattern is embedded in the lens blank). It is clear from inspection cross-sectioned lens blank that the print pattern is below the molded base curve surface of the lens blank.

Differential scanning calorimetry (DSC) of a piece of polymer cut from the lens blank shows that the polymer has a glass transition temperature ($T_g$) of about 63° C. ($2^{nd}$ scan, heating rate of 20° C./minute). Clearly, this material will be glassy and lathable at room temperature based on its glass transition temperature.

EXAMPLE 6

Synthesis of a Silicone-Containing Polymer Having Pendant Functional Groups

A one liter glass reaction vessel equipped with overhead stirring and a nitrogen line is charged with DMA (250.03 grams), TRIS (200.04 grams), HEMA (75.08 grams), PDMS-methacrylate (70–80 cst viscosity, 25. 01 grams), VAZO-64 (1.005 grams), 2-mercaptoethanol (0.5582 grams), and ethylacetate (600.01 grams). The monomers are mixed and nitrogen is bubbled through the mixture for several minutes. The stirring speed is set at 250 RPM and the contents are heated at 40° C. The viscosity of the reaction mixture is noticeable more viscous after 24 hours of reaction. A small amount of copolymer is isolated by precipitation into hexanes and then analyzed by FT-IR (film on NaCl disk). The spectrum shows peaks consistent with ester, amide, and hydroxyl functionality.

Preparation of Photo-Curable Binder Polymer

To 550 grams of the above-prepared copolymer in ethylacetate is added 59 mg of 2,2,6,6-tetramethyl-1-1-piperidinyloxy dissolved in about 5 mL of ethylacetate. The reaction mixture is stirred (overhead stirring) and then a mixture consisting of 76.19 grams of 2-isocyantoethylmethacrylate and 0.364 grams of dibutyltindilaurate is added. The reaction mixture is warmed to about 40–45° C. The reaction is judged to be complete by FT-IR analysis after 60 minutes. This copolymer had a weight average molecular weight of about 122,000 and a polydispersity index of 1.7 (characterized by GPC). The viscosity of a 54% solids content solution of this copolymer is found to be 1790 cps at 25° C. For the preparation of inks in ethanol, the ethylacetate is removed by rotary evaporation and exchanged with anhydrous ethanol.

Preparation of Ink Pastes

Green, blue, black and hazel ink pastes are prepared by milling selected pigment(s) in ethanol (the composition of each ink paste is shown in Table 3), using a roller/ball mill device until all pigment particles are less than about 5 microns. Pigments are milled for about 3 days on a ball mill device. Ceramic jars are charged with pigment, solvent and grinding media (spheres) and then placed on a roller device for grinding until particle size of pigments is in a desirable range.

TABLE 3

| Component | Green Paste | Blue Paste | Black Paste | Hazel Paste |
|---|---|---|---|---|
| Ethanol | 65.18 | 64.84 | 50.03 | 62.72 |
| PCN Blue | 0.14 | 5.14 | | 0.23 |
| Chromium Oxide | 34.68 | | | |
| I.O. Black | | | 49.97 | |
| I.O. Red | | | | 6.05 |

TABLE 3-continued

| Component | Green Paste | Blue Paste | Black Paste | Hazel Paste |
|---|---|---|---|---|
| I.O. Yellow | | | | 28.61 |
| $TiO_2$ | | 30.02 | | 2.38 |

I.O. = iron oxide. All values are percentages by weight.

Ink Formulation and Characteristics.

Inks are formulated by mixing photo-curable binder copolymer with ink paste and photo-initiator. Ink formulations are shown in Table 4.

Inks can be cured on the order of about 10 seconds (light intensity=about 2.7 mW/cm$^2$) and can also be cured within a several minutes at lower intensity UV irradiation. The pad printing performance with inks described below is good as judged by good transfer of inks form cliché to lens molds.

TABLE 4

| Ink | Binder polymer* | photoinitiator | Ink paste* | Ethanol |
|---|---|---|---|---|
| Green | 49.81 | 1.74 | 7.89 | 40.54 |
| Blue | 46.19 | 1.48 | 7.78 | 44.54 |
| Black | 47.34 | 1.60 | 10.12 | 40.93 |
| Hazel | 40.54 | 2.18 | 11.44 | 45.84 |

*The weight percent of copolymer and ink paste are relative to solids content of final ink formulation.

Preparation of Colored Silicone Hydrogel Lenses:

Polypropylene contact lens male mold halves (Base curve) (FreshLook molds) are printed with Hazel ink, Blue ink, and black ink according a procedure similar to that described in Example 5. If desired, molds are corona treated prior to printing. Inks are cured by placing the molds under UVB lights for about 15 minutes (or using UVA light). Light intensity as measured by UVX radiometer is about 2.7 mW/cm$^2$. Female mold halves are filled with a lens formulation (composition: 25.9% by weight of macromer prepared in Example 2,19.2% by weight of TRIS, 28.9% by weight of DMA, 1% by weight of Darocure® 1173, 25% by weight of ethanol). Female mold halves are closed with male mold halves that are previously printed and cured. The mold assemblies are placed under UVB lights (2.7 mW/cm$^2$) for about one hour. Molds are opened and lenses are allowed to soak in Isopropanol for about 90 minutes. The Isopropanol volume during the soaking operation is about 2 mL. The Isopropanol is exchanged with saline (CIBA Vision brand SOFTWEAR Saline). The inks are judged to have good adhesion and durability since print from all colors remained on the lenses. Printed lenses are spherical. Cross-sectional inspection of silicone hydrogel lenses with three prints (hazel, blue and black) reveals that the print pattern is sandwiched between front and back surfaces of the lens. The cross sections are moon shaped and does not appear to have internal stress levels high enough to result in distortion. These results suggest good material compatibility between the lens and the ink.

Silicone hydrogel lenses containing a single print (green) are also produced according to the procedure similar to what is described above. The green ink also had good printing, curing and adhesion properties. The image resolution is excellent. Cross-sectional inspection of the lens shows that the print pattern is embedded between the front and back surface of the lens.

EXAMPLE 7

This example illustrates preparation of silicone hydrogel lenses containing a bronze print according to a method similar to that described in Example 6.

Synthesis of a Silicone-Containing Polymer Having Pendant Functional Groups

A one liter glass reaction vessel equipped with overhead stirring and a nitrogen line is charged with DMA (180.03 grams), TRIS (158.19 grams), HEMA (40.15 grams), PDMS-methacrylate (Gelest MCR-M11, 20.09 grams), VAZO-64 (0.8195 grams), 2-mercaptoethanol (1.2364 grams), and ethylacetate (600.23 grams). The monomers are mixed and nitrogen is bubbled through the mixture for several minutes. The stirring speed is set at 500 RPM and the contents are heated at 40° C. The nitrogen inlet is adjusted so that a stream of nitrogen passes over the reaction mixture. After about 21 hours of heating, 55 mg of 4-hydroxy-TEMPO dissolved in about 25 mL of ethyl acetate is added to the reaction mixture along with an additional 100 mL of ethyl acetate. A small amount of copolymer is isolated by evaporation of a 2 grams of copolymer solution. The resulting solid is dissolved in about 2 mL of anhydrous ethanol. Copolymer is isolated by pouring the ethanol solution into about 10 mL of hexanes followed by precipitation and decanting. After precipitation into hexanes, the isolated copolymer is analyzed by FT-IR (film on NaCl disk) as follows. The resulting copolymer is first dissolved in ethanol. A film is cast from the ethanol solution on to a NaCl disk and then dried in a forced air oven for several minutes at about 50° C. The spectrum shows peaks consistent with ester, amide, and hydroxyl functionality.

Preparation of Photo-Curable Binder Polymer

About 309 grams of the above-prepared copolymer in ethylacetate (~35% copolymer solution) is stirred at about 40° C. A mixture consisting of about 10.15 grams of 2-isocyantoethylmethacrylate and about 0.0689 grams of dibutyltindilaurate is added. The reaction mixture is stirred at about 40–45° C. for about 8 hours. FT-IR analysis of the copolymer solution after about 10 hours of heating is performed and an isocyanate is not observed in the spectrum. For the preparation of inks in ethanol, the ethylacetate is removed by rotary evaporation and exchanged with anhydrous ethanol.

Ink Formulation

Inks are formulated by mixing photo-curable binder copolymer prepared above, photoinitiator, microbronze pigment (Engelhard) or pearlescent pigments (e.g., Dyna Blue, Engelhard), and ethanol. Grinding is not applied to the microbronze or pearlescent pigments. Pigments are used as receive and mixed directly with copolymer, photoinitiator and ethanol. Bronze ink formulations are shown in Table 5.

TABLE 5*

| Bronze Ink | Binder polymer | photoinitiator | Pigment | Ethanol |
|---|---|---|---|---|
| 1583-87-1 | 53.5 | 1.75 | 15.96 | 28.73 |
| 1583-87-3 | 58.12 | 2.41% | 7.14 | 32.33 |
| 1583-83-2 | 61.52 | 1.74 | 3.62 | 33.12 |
| 1583-83-3 | 65.28 | 0.81 | no pigment# | 33.91 |

*All values are percentages by weight.
This ink is for forming a clear coat on a lens.

Preparation of Colored Silicone Hydrogel Lenses:

Colored silicone hydrogel lenses are prepared according to the procedures described in Example 6. A single Bronze print is applied to each contact lens. FreshLook polypropylene contact lens molds are used. If desired, molds are corona treated before printing. The lens formulation used in Example 6 is used to form silicone hydrogel lenses in FreshLook molds with bronze prints. Alternatively, clear coat formulation from Table 5 is used to form silicone hydrogel lenses with bronze prints.

Colored silicone hydrogel lenses are also prepared according to the procedures described above. A single pearlescent blue print is applied to each contact lens. FreshLook polypropylene contact lens molds are used. If desired, molds are corona treated before printing. The lens formulation used in Example 6 is used to form silicone hydrogel lenses in FreshLook molds with bronze prints. Alternatively, a clear coat can be applied on silicone hydrogel lenses with pearlescent prints.

Although various embodiments of the invention have been described using specific terms, devices, and methods, such description is for illustrative purposes only. The words used are words of description rather than of limitation. It is to be understood that changes and variations may be made by those skilled in the art without departing from the spirit or scope of the present invention, which is set forth in the following claims. In addition, it should be understood that aspects of the various embodiments may be interchanged either in whole or in part. Therefore, the spirit and scope of the appended claims should not be limited to the description of the preferred versions contained therein.

What is claimed is:

1. A method of making colored silicone-hydrogel contact lenses, comprising the steps of:
    (a) providing a mold for molding a bonnet, wherein the mold includes a molding surface with optical quality, wherein the molding surface defines one of the posterior and anterior surface of a silicone hydrogel contact lens;
    (b) applying a color coat to at least a portion of the molding surface of the mold with an ink, wherein the ink comprises at least one colorant and a silicone-containing polymer binder;
    (c) curing the colored coat to form a colored film which is in contact with the molding surface but is not covalently attached to the molding surface;
    (d) filling the mold with a lens-forming fluid material comprising at least one silicone-containing vinylic monomer or macromer and at least one hydrophilic vinylic monomer;
    (e) letting the lens-forming material soak the colored film for a period of time sufficient so that a portion of the lens-forming material penetrates into space between the colored film and the molding surface while detaching partially or completely the colored film from the molding surface;
    (f) curing the lens-forming material in the mold to form a bonnet having a molded surface corresponding to one of the anterior and posterior surfaces of the contact lens, wherein the bonnet includes the colored film immobilized therein and/or thereon;
    (g) removing the bonnet from the mold; post-curing and/or drying the bonnet for a time sufficiently long to increase the lathability at room temperature of the bonnet; and (h) directly lathing the bonnet on the side opposite to the molded surface to form the anterior or posterior surface.

2. The method of claim 1, wherein the silicone-containing binder polymer comprises crosslinkable groups selected from the group consisting of ethylenically unsaturated groups, hydroxyl —OH, amino —NHR (wherein R is hydrogen or $C_1$ to $C_8$ alkyl), carboxylic acid —COOH, epoxy, amide —CONHR, isocyanate, peroxy, perester, anhydride, alkoxysilane, silanol, acetoxysilane, silanes, halosilane, and combinations thereof.

3. The method of claim 2, wherein the silicone-containing binder polymer comprises ethylenically unsaturated groups.

4. The method of claim 3, wherein step (c) is carried out by heating or by actinic radiation.

5. The method of claim 2, wherein the silicone-containing binder polymer comprises pendent crosslinkable groups selected from the group consisting of alkoxysilane groups, silanol groups, acetoxysilane groups, silanes groups, halosilane groups, and comination thereof.

6. The method of claim 5, wherein step (c) is carried out by moisture activation.

7. The method of claim 2, wherein the silicone-containing binder polymer comprises crosslinkable groups selected from the group consisting of hydroxyl group —OH, amino group —NHR (wherein R is hydrogen or $C_1$ to $C_8$ alkyl), carboxylic group —COOH, epoxy group, amide group —CONHR, and combinations.

8. The method of claim 2, wherein at least a portion of the molding surface of the mold is pretreated to increase its hydrophylicity or wettability.

9. The method of claim 2, wherein the lens-forming material is a composition capable of forming a silicone hydrogel having a predominant glass transition temperature ($T_g$) of about 25° C. or higher.

10. The method of claim 9, wherein step (h) is performed at room temperature.

11. The method of claim 2, wherein the colored film is soaked by the lens-forming material for from about 5 minutes to about 30 minutes.

12. A method of making colored silicone-hydrogel contact lenses, comprising the steps of:
(a) providing a mold for cast-molding of a bonnet, wherein the mold includes a molding surface with optical quality, wherein the molding surface defines one of the posterior and anterior surface of a silicone hydrogel contact lens;
(b) applying a color coat to at least a portion of the molding surface of the mold with an ink, wherein the ink comprises at least one colorant and a polymer binder, wherein the binder polymer comprises segments derived from at least one hydrophilic vinylic monomer or macromer;
(c) optionally curing the colored coat to form a colored film which is not covalently attached to the molding surface;
(d) filling the mold with a lens-forming fluid material comprising at least one silicone-containing vinylic monomer or macromer and at least one hydrophilic vinylic monomer;
(e) curing the lens-forming material in the mold to form a bonnet having a molded surface corresponding to one of the anterior and posterior surfaces of the contact lens, wherein the bonnet includes the colored coat or film immobilized therein and/or thereon, wherein the molded surface of the bonnet includes at least a portion of the colored coat or film; removing the bonnet from the mold;
(f) post-curing and/or drying the bonnet for a time sufficiently long to increase the lathability at room temperature of the bonnet; and
(g) directly lathing of the bonnet on the side opposite to the molded surface to form the anterior or posterior surface.

13. The method of claim 12, wherein the binder polymer comprises crosslinkable groups selected from the group consisting of ethylenically unsaturated groups, hydroxyl —OH, amino —NHR (wherein R is hydrogen or $C_1$ to $C_8$ alkyl), carboxylic acid —COOH, epoxy, amide —CONHR, isocyanate, peroxy, perester, anhydride, alkoxysilane, silanol, acetoxysilane, silanes, halosilane, and combinations thereof.

14. The method of claim 12, wherein the binder polymer comprises segments derived from at least one silicone-containing vinylic monomer or micromere.

15. The method of claim 14, wherein the silicone-containing binder polymer comprises ethylenically unsaturated groups.

16. The method of claim 14, wherein the silicone-containing binder polymer comprises pendent crosslinkable groups selected from the group consisting of alkoxysilane groups, silanol groups, acetoxysilane groups, silanes groups, halosilane groups, and comination thereof.

17. The method of claim 12, wherein at least a portion of the molding surface of the mold is pretreated to increase its hydrophylicity or wettability.

18. The method of claim 12, wherein the lens-forming material is a composition capable of forming a silicone hydrogel having a predominant glass transition temperature ($T_g$) of about 25° C. or higher.

19. The method of claim 18, wherein step (g) is performed at room temperature.

20. The method of claim 14, further comprising, between steps (d) and (e), a step of soaking the colored film for a period of time sufficient so that a portion of the lens-forming material penetrates into space between the colored film and the molding surface while detaching partially or completely the colored film from the molding surface.

* * * * *